United States Statutory Invention Registration [19]

[11] Reg. Number: H344

Williamsen et al. [43] Published: Oct. 6, 1987

[54] HIGH VELOCITY CANTING SHAPED CHARGE WARHEAD

[75] Inventors: Joel E. Williamsen; Michael C. Schexnayder, both of Huntsville, Ala.

[73] Assignee: The United States of America as represented by the Secretary of the Army, Washington, D.C.

[21] Appl. No.: 26,089

[22] Filed: Mar. 16, 1987

[51] Int. Cl.[4] ..... F42B 11/22

[52] U.S. Cl. ..... 102/476

*Primary Examiner*—Harold J. Tudor

*Attorney, Agent, or Firm*—John C. Garvin, Jr.; Freddie M. Bush; James T. Deaton

[57] ABSTRACT

A missile having a shaped charge warhead mounted therein for being canted at or near a target to present the shaped charge warhead in an advantageous position for destroying the target.

7 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH VELOCITY CANTING SHAPED CHARGE WARHEAD

DEDICATORY CLAUSE

The invention described herein may be manufactured, used, and licensed by or for the Government for governmental purposes without the payment to us of any royalties thereon.

BACKGROUND OF THE INVENTION

In the past, shaped charge warheads have been used to penetrate and defeat various types of armored vehicles. As a result, many of these armored vehicles have now incorporated highly sloped frontal armor surfaces which increase the thickness of armor that must be penetrated for frontal attack by shaped charges. Because of this and since present day shaped charged warheads generally attack the armored vehicle head-on, there is a need for a device that can attack the armor of the vehicle in such a manner as to attack the armor in a more advantageous way.

Accordingly, it is an object of this invention to provide a missile with a canting shaped charge warhead for attacking the armor of a vehicle at a thinner cross section.

Another object of this invention is to provide a shaped charge that is canted at the target to an angle which is near normal to the armor surface when the shaped charge is set off.

Still another object of this invention is to utilize a shaped charge that is canted in such a manner that the shaped charge can have a diameter that is that of the missile to provide for maximum warhead diameter relative to missile diameter.

Yet another object of this invention is to provide a missile with a canted shaped charge warhead so as to not require complex trajectory shaping for the missile.

Other objects and advantages of this invention will be obvious to those skilled in this art.

SUMMARY OF THE INVENTION

In accordance with this invention, a missile is provided that has a self-contained warhead section which includes a shaped charge explosive device that is separate from the missile structure and canted at the target to orient the shaped charge explosive device into a position for firing through a thinner section of an armored vehicle when the explosive charge of the warhead impacts the armored vehicle. By canting the shaped explosive charge device at the target allows the use of a maximum shaped charge warhead with respect to the overall diameter of the missile in order to provide a charge that has ample capability of penetrating the target.

DESCRIPTION OF THE PREFERRED EMBODIMENT

Figure 1:
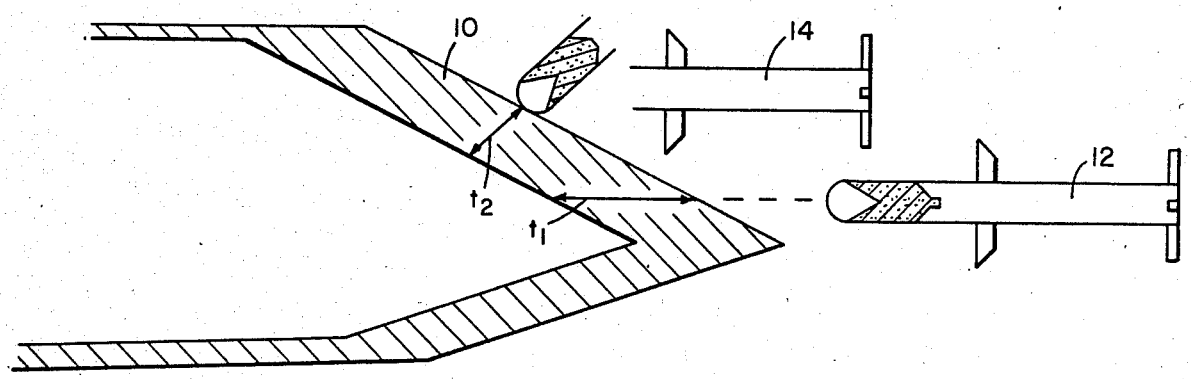
FIG. 1 is a schematic drawing partially in section and illustrating the advantages of attacking the armor from an angle as opposed to head-on, FIG. 2 is a sectional view illustrating the warhead section and canting means for the warhead.
Figure 2:
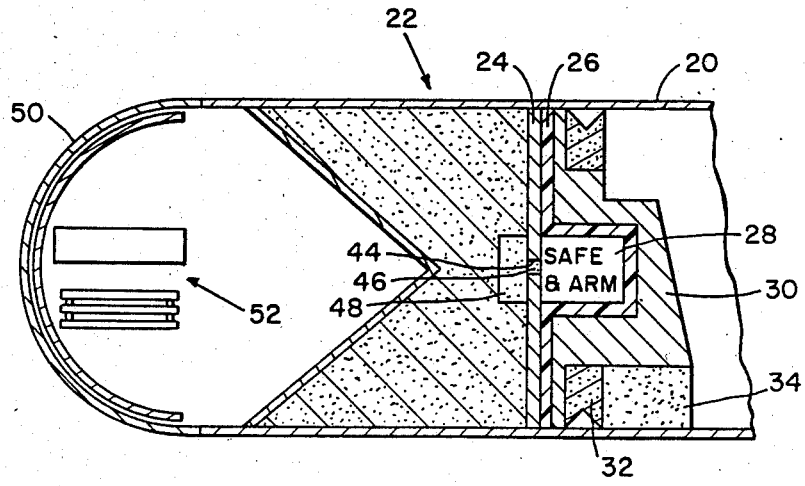
Figure 3:
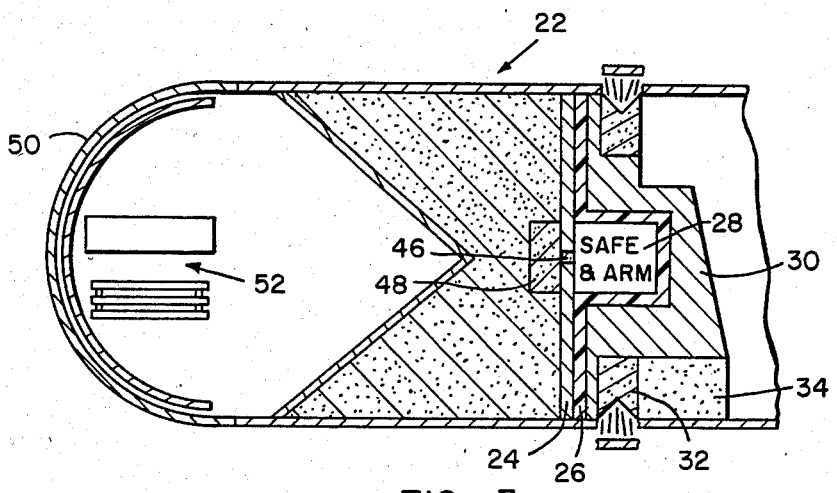
FIG. 3 is a sectional view illustrating the warhead as it is being separated from other missile structure.
Figure 4:
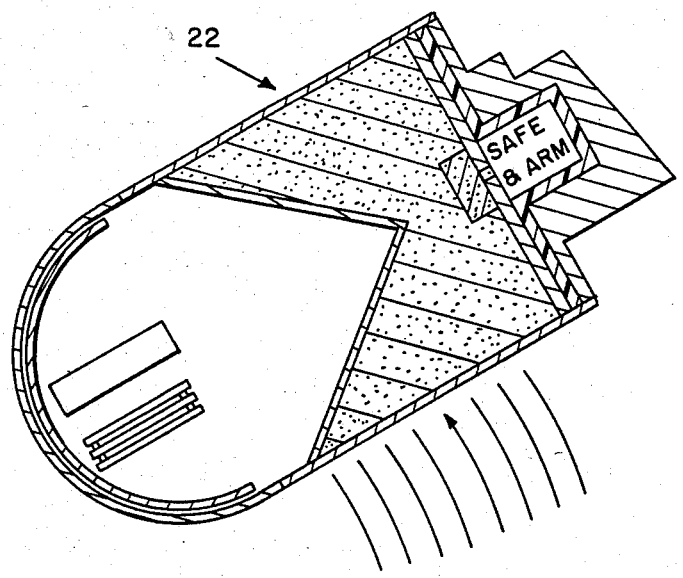
FIG. 4 is a sectional view illustrating the warhead in a separated and canted position.
Figure 5:
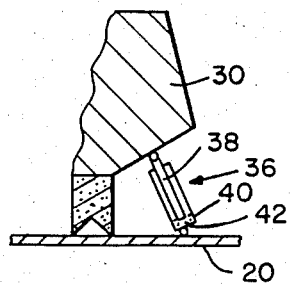
FIG. 5 is a sectional view and partially cut-away illustrating a pyrotechnic piston actuator for the warhead.
Figure 6:
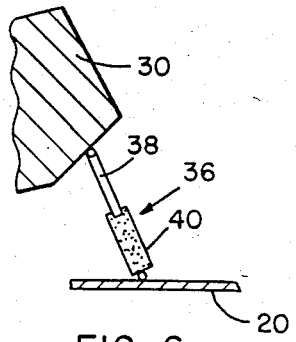
FIG. 6 is a sectional view illustrating the pyrotechnic piston actuator in an extended position.

Referring now to the drawing, in FIG. 1, armor 10 of an armored vehicle is schematically illustrated and a missile 12 with a conventional head-on shaped charge warhead therein is illustrated approaching armor 10 and in this approach the shape charge warhead must travel distance $t_1$ as illustrated in order to penetrate the armor with the shaped charge warhead of missile 12. Applicants have realized that a missile 14 with a shaped charge warhead therein that is canted as illustrated at the target can penetrate the armor more readily. If attacked as illustrated by the canted shaped charge of the warhead of missile 14, the shaped charge must penetrate only the distance illustrated at $t_2$. This particular canted warhead is disclosed in more detail in FIGS. 2 through 6 and includes missile housing 20 with shaped charge warhead 22 mounted in a front position of the missile housing. Shaped charge warhead 22 has a steel wall 24 and shock attenuating material 26 for protecting the shaped charge from sympathetic detonation. A safe and arm device 28 of conventional structure is mounted between members 24 and 26 as illustrated. A reinforced steel housing 30 is mounted around a portion of shock absorbing material 26 and adjacent a portion of material 26. A pyrotechnic shaped charge cutting ring 32 of conventional structure is mounted about a portion of steel housing 30 and is adapted when detonated to cut and sever missile housing 20 adjacent cutting ring 32. An explosive charge 34 is mounted to one side of steel housing 30 as illustrated in FIG. 2 or a pyrotechnic piston actuator 36 as illustrated in FIGS. 5 and 6 is provided for canting or pivoting the severed front portion with shaped charge warhead 22 therein to a predetermined canted position which is about 30°. This places shaped charge warhead 22 in an advantagious position relative to armor 10 as depicted in FIG. 1. Piston actuator 36 includes piston 38 that is pivotably connected to steel housing 30, and cylinder 40 that is pivotably connected to missile housing 20. A conventional pyrotechnic charge 42 is provided in cylinder 40 for providing gas to cause piston 40 to be actuated and cant the shaped charge warhead.

The nose or front portion 50 of the missile has a conventional contact type switch or a target proximity sensor means 52 which senses the target and completes a circuit (not illustrated) to safe and arm device 28 to cause an explosive charge in safe and arm device 28 to be set off at the appropriate time, to pyrotechnic cutting ring 32 for cutting and severing the missile housing, and to explosive 34 or 42 for causing canting of the shaped charge warhead. The circuit (not illustrated) first causes cutting ring 32 to be set off, then detonation of explosive 34 or 42 and finally the explosive charge of safe and arm device 28. Steel wall 24 has opening 44 therethrough and explosive 46 is placed in opening 44 to be set off by the explosive charge of safe and arm device 28. Explosive 46 in turn sets off booster pellet charge 48 which in turn sets off the main shaped charge warhead charge.

In operation, the missile is fired in a normal manner and when the missile approaches or contacts a target, the target sensor switch or contact switch in the nose of the missile completes a circuit to pyrotechnic cutting ring 32 that severs missile housing 20 and shortly thereafter explosive 34 or 42 is set off to cause the front portion of the missile with shaped charge warhead therein to be canted in a more advantagious position of the shape charged warhead relative to the armor of the target and with the shaped charge warhead positioned, safe and arm mechanism 28 is caused to set off its explosive charge and in turn set off explosive 46 and booster 48 to set off the main shaped charge of the shaped charge warhead and the shaped charge warhead then jets its force into the armor of the target to destroy the target. The short time delays between setting off of cutting ring 32, charge 34 or 42 and the charge of safe and arm device 28 can be any conventional time delay means for accomplishing time delays of these types.

It is pointed out that the canting of a shaped charge warhead as provided in this invention is an inexpensive improvement to shaped charge penetration potential of missile systems, and especially for those missile systems that have a small diameter missile which requires maximum penetration potential for a finite missile diameter.

We claim:

1. A missile having a shaped charge warhead mounted in a front portion thereof, said shaped charge warhead being mounted in a position in which the longitudinal axis through the warhead is substantially parallel to the longitudinal axis of the missile, explosive means mounted for canting the warhead to a canted position relative to the longitudinal axis of the missile, means for separating said front portion from said missile to allow said warhead to be canted to the canted position, and means for setting off said warhead in said canted position.

2. A missile as set forth in claim 1, wherein said separating means is a pyrotechnic cutting ring for cutting the missile into two sections.

3. A missile as set forth in claim 2, wherein said means for setting off said warhead includes sensor means at a nose section of said missile to sense a target, and safe and arm means that is controlled by said sensor means for setting off said warhead.

4. A missile as set forth in claim 3, wherein said explosive means is an explosive charge between a portion of missile housing structure and protective means for the warhead that protects the warhead from shock created from said explosive means.

5. A missile as set forth in claim 4, wherein said protective means includes a first steel wall at a base of said shaped charge, a shock attenuating layer of material contiguous said first steel wall, and a second steel wall mounted over another contiguous surface of said shock attenuating layer.

6. A missile having a shaped charge warhead mounted in a front portion thereof, and means for canting said shaped charge warhead toward a target as the missile arrives at the target.

7. A missile as set forth in claim 6, wherein said means includes explosive means for canting said front portion relative to the remainder of the missile.

* * * * *